United States Patent
Eberle et al.

(10) Patent No.: US 9,440,168 B2
(45) Date of Patent: *Sep. 13, 2016

(54) FILTER DEVICE WITH WATER SEPARATOR, SEPARATION ZONE, COLLECTION SPACE AND PLURAL FLUID PASSAGES, INCLUDING DUAL PASSAGES WITHIN AN ADAPTER PART SECURED UPON A FILTER ELEMENT RETAINER

(75) Inventors: Richard Eberle, Ormesheim (DE); Micha Kreibig, Rehlingen-Siersburg (DE)

(73) Assignee: HYDAC FILTERTECHNIK GMBH, Sulzbach/Saar (DE)

(*) Notice: Subject to any disclaimer, the term of this patent is extended or adjusted under 35 U.S.C. 154(b) by 107 days.

This patent is subject to a terminal disclaimer.

(21) Appl. No.: 13/261,415

(22) PCT Filed: Mar. 2, 2011

(86) PCT No.: PCT/EP2011/001013
§ 371 (c)(1),
(2), (4) Date: Aug. 30, 2012

(87) PCT Pub. No.: WO2011/107264
PCT Pub. Date: Sep. 9, 2011

(65) Prior Publication Data
US 2012/0318728 A1 Dec. 20, 2012

(30) Foreign Application Priority Data
Mar. 4, 2010 (DE) .......................... 10 2010 010 304

(51) Int. Cl.
*B01D 27/00* (2006.01)
*B01D 36/00* (2006.01)
(Continued)

(52) U.S. Cl.
CPC ............. *B01D 29/23* (2013.01); *B01D 35/153* (2013.01); *B01D 35/16* (2013.01); *B01D 35/30* (2013.01);
(Continued)

(58) Field of Classification Search
None
See application file for complete search history.

(56) References Cited

U.S. PATENT DOCUMENTS

| | | | |
|---|---|---|---|
| 3,165,470 A | 1/1965 | Giesse et al. | |
| 3,187,895 A | 6/1965 | Pall et al. | |

(Continued)

FOREIGN PATENT DOCUMENTS

| | | |
|---|---|---|
| DE | 100 64 482 A1 | 7/2002 |
| DE | 103 09 428 A1 | 9/2004 |

*Primary Examiner* — Bobby Ramdhanie
*Assistant Examiner* — Hayden Brewster
(74) *Attorney, Agent, or Firm* — Wenderoth, Lind & Ponack, L.L.P.

(57) ABSTRACT

A filter device, in particular for fluids polluted with admixtures of water, such as diesel oil, includes a filter housing (1) having a fluid inlet (51), a fluid outlet and at least one filter element (9). During the filtering process, fluid can flow through the filter medium (11) of the filter element from the unfiltered side (13) to the filtered side (19) of the filter medium. The filtered side surrounds an inner filter cavity (17). On one side of the filter medium (11), a water-separating device (26) and a separating region (27) for separated water are present. The filter element (9) has a passage (43) that forms a fluid connection to the filter cavity (17) and at least one water opening (47) that is open toward the separating region (27). The filter element can be fixed to an element receptacle (29) of the filter housing (1) and can be connected to a water collecting chamber (33). An adapter part (49) is provided at least as part of a fluid-conducting system, in which fluid paths separated from each other are formed. A first fluid path (59, 67, 61) leads from a fluid connection (51) of the housing (1) via the passage (43) to the inner filter cavity (17) of the filter element (9). A second fluid path (69) connects the respective water opening (47) to the water collecting chamber (33).

15 Claims, 3 Drawing Sheets

(51) Int. Cl.
    *B01D 29/23*    (2006.01)
    *B01D 35/153*   (2006.01)
    *B01D 35/16*    (2006.01)
    *B01D 35/30*    (2006.01)
    *B01D 35/10*    (2006.01)
    *B01D 29/58*    (2006.01)
    *B01D 29/11*    (2006.01)
    *F02M 37/22*    (2006.01)

(52) U.S. Cl.
    CPC .......... *B01D 35/306* (2013.01); *B01D 36/003* (2013.01); *B01D 29/117* (2013.01); *B01D 29/58* (2013.01); *B01D 2201/295* (2013.01); *B01D 2201/34* (2013.01); *B01D 2201/4007* (2013.01); *B01D 2201/4084* (2013.01); *F02M 37/221* (2013.01)

(56) References Cited

U.S. PATENT DOCUMENTS

| | | | |
|---|---|---|---|
| 4,253,954 A | 3/1981 | Midkiff et al. | |
| 6,245,232 B1* | 6/2001 | Craft | 210/249 |
| 2002/0070546 A1* | 6/2002 | Johll et al. | 285/124.1 |
| 2002/0117441 A1 | 8/2002 | Smith et al. | |
| 2003/0121858 A1* | 7/2003 | Yu et al. | 210/654 |
| 2008/0135469 A1* | 6/2008 | Fremont et al. | 210/234 |
| 2009/0014381 A1* | 1/2009 | South et al. | 210/418 |

\* cited by examiner

FILTER DEVICE WITH WATER SEPARATOR, SEPARATION ZONE, COLLECTION SPACE AND PLURAL FLUID PASSAGES, INCLUDING DUAL PASSAGES WITHIN AN ADAPTER PART SECURED UPON A FILTER ELEMENT RETAINER

FIELD OF THE INVENTION

The invention relates to a filter device intended in particular for fluids, such as diesel oil contaminated with water impurities. A filter housing has fluid connections in the form of a fluid inlet and a fluid outlet and can accommodate at least one filter element. During the filtration process, the fluid can flow through the filter medium of the filter element from the unfiltered side to the filtered side of the filter medium surrounding an inner filter cavity. One side of the filter medium has a water separation device and a separation zone for separated water. The filter element has a passage forming a fluid connection to the filter cavity. At least one water passage is open in the direction of the separation space. The filter element can be secured on an element retainer of the filter housing and can be connected to a water collecting space.

BACKGROUND OF THE INVENTION

Filter devices of this type are known from the prior art. Such filter devices are used, for example, in fuel systems for internal combustion engines to protect sensitive components, in particular the injection systems, against degradation due to the water content entrained in the fuel. Separation of the water content entrained in the fuel can be brought about by a coagulation process where water droplets are formed on the filter medium. These water droplets can flow from the separation space, formed in the filter element, to the water collecting space.

Owing to the high requirements imposed on the operational reliability of those filter devices, the design configuration of the fluid connections between the ports of the housing and the filter element, as well as between the filter element and the water collecting space, have to be complex. Since such devices will likely be produced in large quantities, the production costs are a significant factor.

SUMMARY OF THE INVENTION

An object of the present invention is to provide an improved filter device of the aforementioned type that is economical and efficient to produce.

The present invention basically achieves this object with a filter device having an adapter part accommodated preferably at the element retainer of the filter housing and provided as the fluid-conducting device providing the pertinent fluid connections. The adapter part forms fluid paths separated from each other. A first fluid path leads from a fluid connection by way of the passage to the inner filter cavity of the filter element. A second fluid path connects the respective water passage at the filter element to the water collecting space. Since the fluid-conducting device need not be a component of the filter element, just the filter element alone can be easily manufactured in a simple design and can be produced at a low cost without the cost-intensive fluid-conducting elements. In contrast to those fluid-conducting elements that belong to the filter element—such as the fluid-conducting elements that are implemented, for example, by an intricately designed end cap of the filter element and that have to be changed together with the used filter element when changing the filter element, the present invention provides that the fluid-conducting device can stay in the form of the adapter part at the element retainer in the filter housing so that an additional cost advantage is gained. Another advantage lies in the fact that adapter parts of uniform construction can be used for filter elements that can be secured on the element retainer even though those filter elements may vary in design and/or meet different specifications. The adapter parts can then be manufactured identically in large quantities and, therefore, economically and efficiently. However, the respective adapter part, designed preferably as a clip part, can be securely fitted on the underside of the respective filter element, for example, on the lower end cap of the filter element.

In the exemplary embodiments, in which the lower end of the filter element has an end cap with the passage leading into the filter cavity and with the at least one water passage, the end cap can be brought into a sealed fluid communication with the adapter part. This feature can be easily implemented if, for example, the end cap can be secured on the element retainer to form a seal, or the adapter part is sealed off at the element retainer.

In the exemplary embodiments, where during the filtration operation the fluid can flow through the filter medium of the filter element from the outer unfiltered side to the inner filter cavity forming the filtered side of the filter medium, the first fluid path of the adapter part connects the passage of the end cap leading into the filter cavity to the fluid outlet of the housing; and the second fluid path of the adapter part connects the respective water passage of the end cap to the water collecting space.

In especially preferred exemplary embodiments, the element retainer has a pipe connector forming the connection between the main part of the housing accommodating the filter element and the water collecting space located underneath the main part. The adapter part has a sleeve body that can be accommodated in the pipe connector. The fluid connection between the end cap and the adapter part can then be easily implemented in that the end cap is sealed on the exterior of the pipe connector of the element retainer. Inside this pipe connector, the adapter part forms the separated fluid paths for the separated water and the fluid that is to be cleaned. A seal on the interior of the pipe connector is also possible.

In especially preferred exemplary embodiments, the sleeve body of the adapter part has an inner tube having an open end forming a connecting piece. The connecting piece extends in a sealing manner through the passage of the end cap into the filter cavity of the filter element located in the functional position and forms a subsection of the first fluid path.

According to one advantageous design, an intermediate space forming a water channel can be provided between the exterior of the inner tube and the interior of the sleeve body. In this context, the intermediate space forms the second fluid path for water issuing from the respective water passage of the end cap to flow through the open lower end of the sleeve body into the water collecting space.

With respect to routing the first fluid path, the annular sections projecting radially beyond the exterior of the sleeve body can come into sealing contact with the interior of the pipe connector of the element retainer and can be arranged at an axial distance from one another. Between them, an annulus is then formed on the exterior of the sleeve body and on the interior of the pipe connector. This annulus is in communication, as the outlet section of the first fluid path, with the fluid outlet of the housing.

For the rest of the way of the first fluid path, the adapter part can be advantageously configured such that a cross duct branches off in the region of the lower end of the inner tube of the adapter part facing away from the connecting piece. This cross duct empties into the annulus and continues the first fluid path through the inner tube and its connecting piece.

To secure the end cap of the filter element in a sealed manner on the element retainer, the pertinent end cap can have a bearing ring projecting axially downward from the end cap bottom and engaging with the facing end of the pipe connector of the element retainer to form a seal.

In especially preferred exemplary embodiments, the respective end cap of the filter element has an annular body that surrounds the passage and projects axially from the end cap bottom into the separation space. The interior of this annular body has at least one water passage.

If the end cap has a second axially projecting annular body surrounding the passage and arranged radially inside the first annular body, this first annular body can then form a support for a hydrophobic screen belonging to the separation device. This hydrophobic screen rests against the exterior of the second annular body. When the filter element is located in the functional position, the connecting piece at the end of the inner tube of the adapter part can extend into the annular body and can be sealed off from its interior.

The end cap bottom can have a ring-shaped bottom depression in the region located between the first and second pair of annular bodies. At least one breakthrough is then provided as the water passage at the lowest point of the separation space formed in this way.

In the case of a seal formed between the end cap bottom and the pipe connector of the element retainer when the filter element is secured on the element retainer, a sealing device that seals off the outer circumferential edge of the end cap from the inner wall of the filter housing can be omitted, so that a seal having a correspondingly large diameter can be eliminated. Instead, the seal between the unfiltered side and the filtered side is implemented with a significantly smaller sealing diameter, so that less physical effort is required for assembly and, as a result, the filter elements are easier to install and remove.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
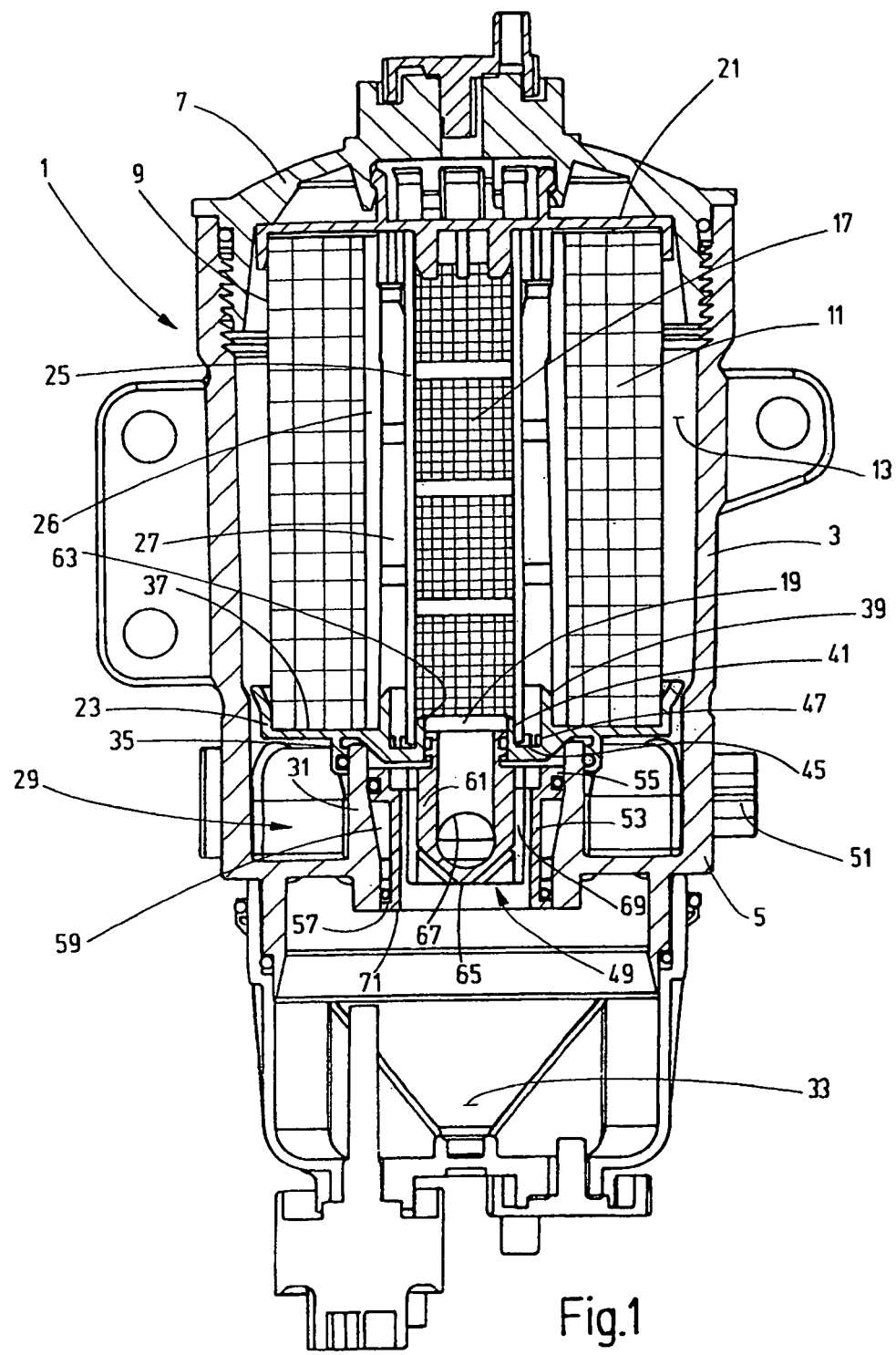
FIG. 1 is a side elevational view section of a filter device in the form of a fuel filter according to a first exemplary embodiment of the invention.

The invention is explained below, using the example of a fuel filter to be provided in a fuel supply system (not illustrated) of an internal combustion engine for cleaning diesel oil contaminated with certain water impurities. The invention also lends itself to other kinds of fluids.

The device has a filter housing 1 comprising a main part 3 in the form of a hollow cylinder and a bottom part 5 located on the underside or the lower side of the main part. At the upper end, a housing cover 7 is screwed or threaded to the main part 3. This housing cover 7 can be removed for installing and removing a filter element 9. The filter medium 11 of the filter element 9 accommodated in the filter housing 1 is formed by a filter mat, forming a hollow cylinder. Between the exterior of the filter medium 11 and the inner wall of the housing 1, an intermediate space forms the unfiltered side 13 during the filtration operation. The fuel that is to be cleaned is fed to the unfiltered side 13 by a fluid connection of the housing 1. This fluid connection cannot be seen in the drawing because of the rotational position of the filter housing. During the filtration operation, the fuel flows through the filter medium 11 from the outer unfiltered side 13 inward to an inner filter cavity 17 that forms the filtered side 19.

The ends of the filter element have in the conventional manner end caps 21 and 23 forming enclosures for the filter medium 11. A fluid-permeable support tube 26 rests against the interior of said filter medium. A hydrophobic screen 25 surrounds the inner filter cavity 17 in the form of a tube and is located at a radial distance from the support tube 26. To effect water separation, such fuel filters use a filter medium 11 that acts in a coagulating manner on the water entrained by the fuel. Water precipitates out in droplet form. This water remains and sinks down in the separation space 27, forming a separation zone between the hydrophobic screen 25 and the support tube 26, because the screen is impermeable to coagulated water droplets.

The filter element 9 is secured with its lower end cap 23 on an element retainer 29 rigidly mounted in the housing. This element retainer 29 has the form of a pipe connector 31 forming the connection between the main part 3 of the housing 1 that accommodates the filter element 9 and the water collecting space 33 located underneath the main part. To secure the filter element 9 on the element retainer 29, the lower end cap 23 has a bearing ring 35 extending axially downward from the end cap bottom 37. End cap bottom 37 forms the support for the ends of the filter medium 11 and the support tube 26, and engages the upper edge region of the pipe connector 31 of the element retainer 29 when the filter element 9 is detachably mounted in the functional position. A sealing element, sitting in the bearing ring 35, forms the seal. In the first exemplary embodiment shown in FIGS. 1 and 2, the bearing ring 35 surrounds two annular bodies 39 and 41 arranged at a radial distance from one another. The annular bodies 39, 41 project axially into the interior of the filter element 9 away from the end cap bottom 37 and surround the passage 43 leading into the inner filter cavity 17. The support tube 26 rests against the exterior of the radially outer annular body 39. The hydrophobic screen 25 rests against the exterior of the annular body 41 disposed further on the inside. In the intermediate space between the annular bodies 39 and 41, the end cap bottom 37 forms a bottom depression 45 in the form of an annular trough. This bottom depression forms the lowest point of the separation space 27 and is perforated by breakthroughs that form the water passages 47.

A fluid-conducting device is provided for the interaction with the end cap 23 and the pipe connector 31 of the element retainer 29. This fluid-conducting device is formed by an adapter part 49 having as a one-piece molded part made of plastic, the form of a rotational body accommodated in the pipe connector 31 of the element retainer 29. In its function as the fluid-conducting device, the adapter part 49 forms fluid paths that are separated from one another. Of these fluid paths, the first fluid path extends from a fluid connection of the housing 1, which fluid connection forms a fluid outlet 51 in the present example, through the passage 43 of the end cap 23 to the filter cavity 17. The second fluid path connects the separation space 27 of the filter element 9 to the water collecting space 33.

Figure 2:
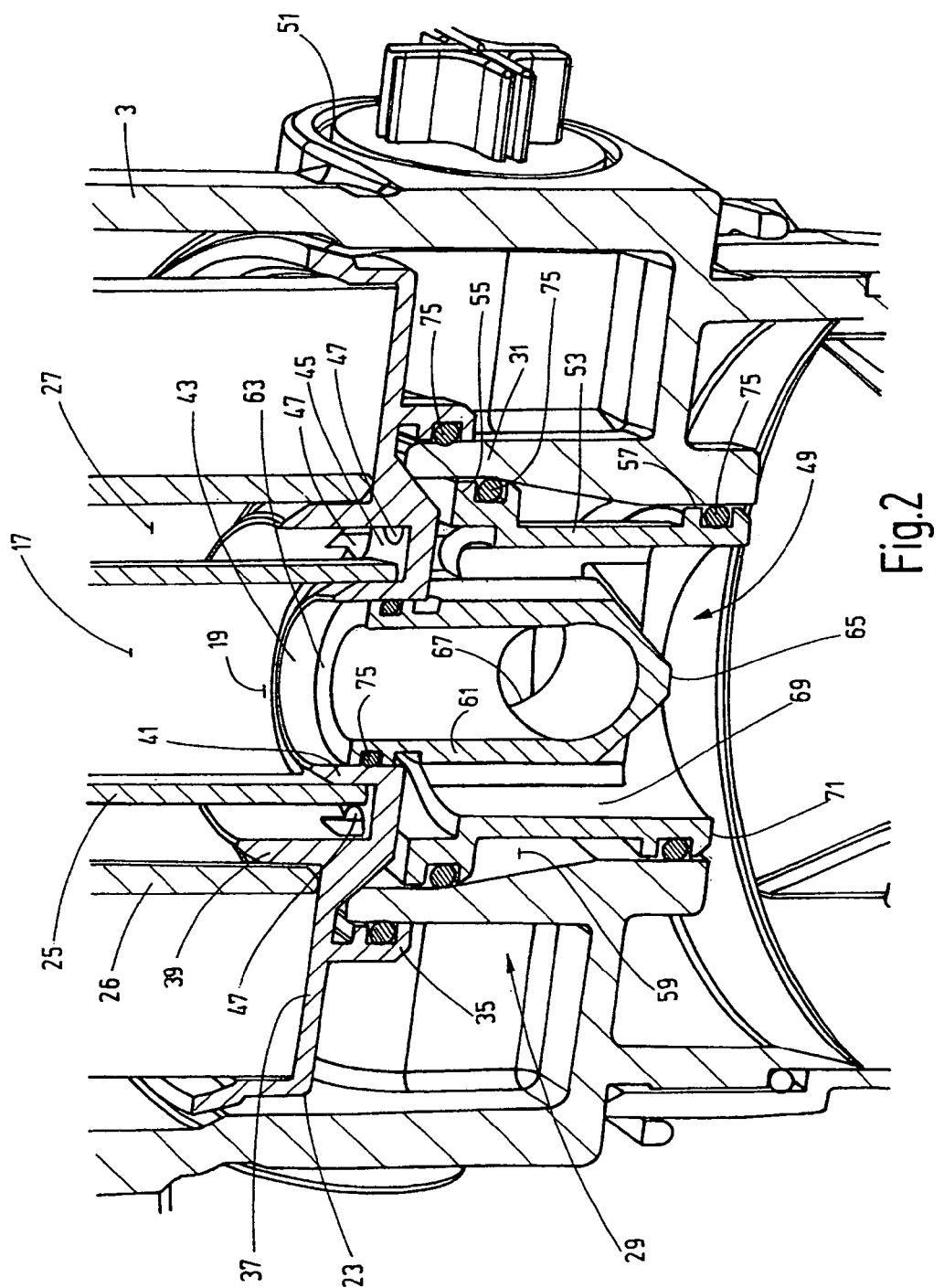
FIG. 2 is an enlarged, partial perspective view in section of a region adjacent to the element retainer of the exemplary embodiment of FIG. 1.
Figure 3:
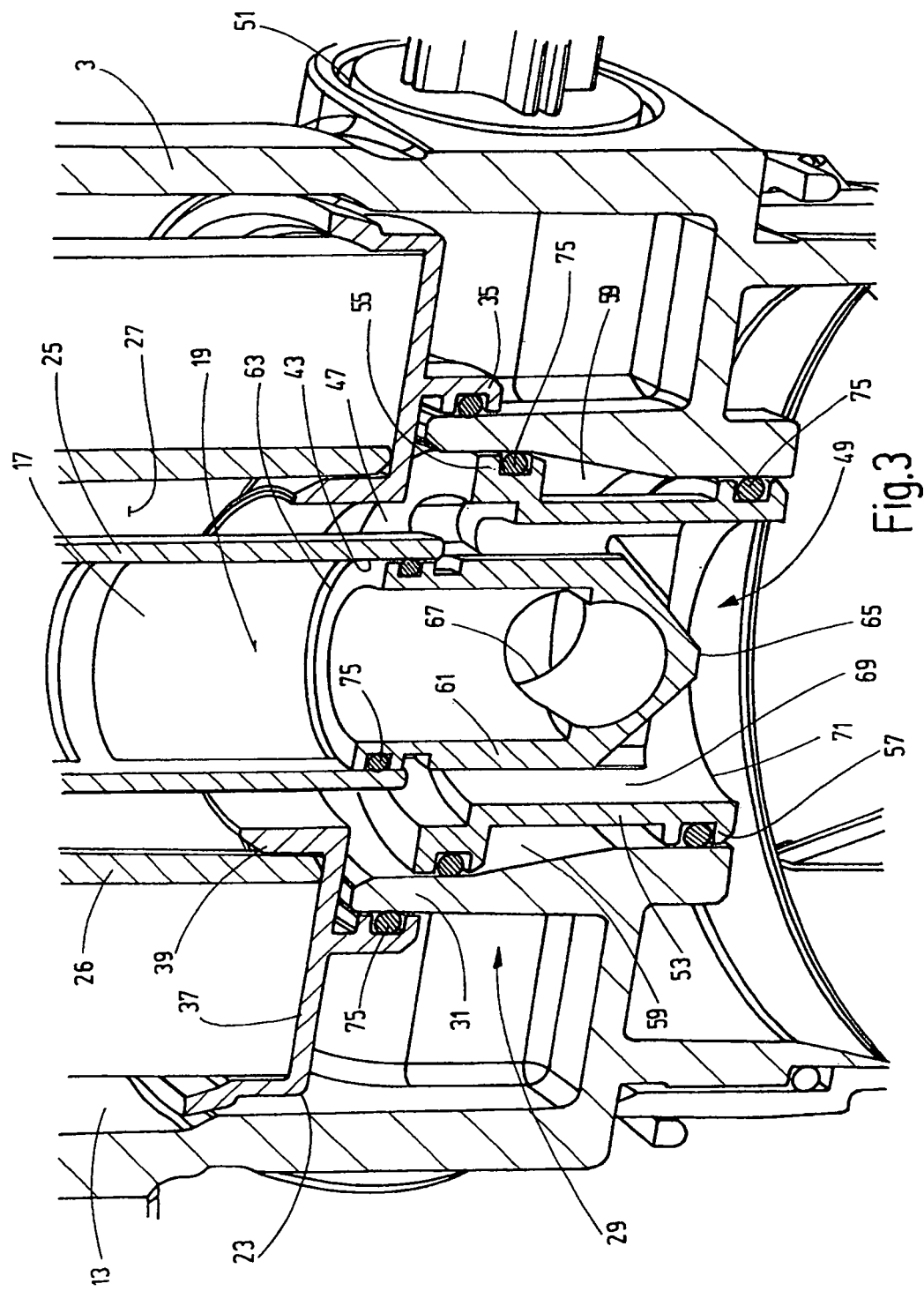
FIG. 3 is an enlarged, partial perspective of a region adjacent the element retainer of a fuel filter according to a second exemplary embodiment of the invention.

FIGS. 2 and 3 show that the adapter part 49 has a sleeve body 53. On the exterior of sleeve body 53 two radially projecting annular sections 55 and 57 make sealing contact with the interior of the pipe connector 31. The annular sections 55, 57 are set at an axial distance from one another, forming an annulus 59 between them. Annulus 59 is connected, as the subsection of the first fluid path, to the fluid outlet 51 by a fluid connection that is not visible in the drawing. Inside the sleeve body 53, in coaxial arrangement, an inner tube 61 extends in a sealing manner with its upper open end 63 into the annular body 41. Annular body 41 forms the passage 43 and is a part of the end cap 23 in the functional position. In the region of the closed lower end 65 of the inner tube 61, a cross duct 67 branches off from the lower end of the inner tube. This cross duct 67 empties into the annulus 59 and, thus, completes the first fluid path through the inner tube 61 into the filter cavity 17. The exterior of the inner tube 61 is at a distance from the interior of the sleeve body 53, so that a water channel 69 is formed. Water enters water channel 69 from the separation space 27 by way of the water passages 47 of the end cap 23 and flows out through the lower open end 71 of the sleeve body 53 to the water collecting space 33. In this way, the water channel 59 in the adapter part 49 forms the second fluid path.

The second exemplary embodiment from FIG. 3 differs from the first exemplary embodiment, only in its simplified design of the end cap 23 of the filter element 9. The filter housing 1 and the element retainer 29 are identical in construction. The same adapter part 49 can be used as in the first exemplary embodiment. As in the previous example, the end cap 23 is secured on the pipe connector 31 of the element retainer 29 by the bearing ring 35 engaging the pipe connector 31 at its upper edge. In contrast to the first exemplary embodiment, the end cap bottom 37 does not exhibit the trough-like bottom depression 45 and the inner annular body 41 connected to it. Instead, the upper end 63 of the inner tube 61 of the adapter part 49 engages directly with the hydrophobic screen 25 of the filter element. The opening, surrounded by the annular body 39, forms, with the entire intermediate space between the hydrophobic screen 25, the water passage 47 connecting the separation space 27 to the water channel 69 in the adapter part 49.

In both exemplary embodiments, the sealing between the bearing ring 35 of the end cap 23 and the pipe connector 31 of the element retainer 29 as well as of the sleeve body 53 of the adapter part 49 relative to the pipe connector 31 and similarly the sealing of the inner tube 61 of the adapter part 49 at the passage 43 to the filter cavity 17 are formed in each instance by an O-ring 75. Unlike conventional filter devices, the outer periphery of the end cap 23 need not be sealed off from the interior of the filter housing 1 when the unfiltered side 13 is sealed off from the filtered side 19 by the bearing ring 35 of the end cap relative to the pipe connector 31. Moreover, the respective adapter part 49 is secured in position by the at least partially conical inner wall of the respective receptacle 31, with the adjoining cylindrical sections, on which the O-ring 75 of the adapter part 49 is supported. The flow direction of the device can also be reversed with a few structural adaptations. The water separation device 26 can also be constructed as a part of the element retainer 29 in an embodiment that is not illustrated herein.

While various embodiments have been chosen to illustrate the invention, it will be understood by those skilled in the art that various changes and modifications can be made therein without departing from the scope of the invention as defined in the appended claims.

What is claimed is:

1. A filter device for fluids contaminated with water impurities, comprising:
   a filter housing having a fluid inlet and a fluid outlet;
   at least one filter element being in said filter housing and having a filter medium with an unfiltered side and a filtered side through which a fluid can flow from said unfiltered side to said filtered side, said filtered side surrounding an inner filter cavity;
   a water separator and a separation zone for separated water on one side of said filter medium;
   a filtered fluid passage in said filter element forming a fluid connection to said inner filter cavity;
   a water passage in said filter element open in a direction of said separation zone;
   an element retainer in said filter housing, said filter element being secured on said element retainer;
   a water collecting space in said filter housing connected to said filter element; and
   an adapter part forming a fluid conductor and having first and second fluid passages therein, said first fluid passage extending between and connecting said filtered fluid passage and said fluid outlet to connect said inner filter cavity to said fluid outlet, said second fluid passage extending between and connecting said water passage to said water collecting space, said adapter part being mounted in said element retainer.

2. A filter device according to claim 1 wherein said water separator and said water separation zone are components of said filter element.

3. A filter device according to claim 1 wherein an end cap on a lower end of said filter element comprises said filtered fluid passage and said water passage and is sealed to said adapter part.

4. A filter device according to claim 1 wherein said water collecting space is connected to said filter housing at a lowest point of said filter housing; and said element retainer is located above said water collecting space.

5. A filter device according to claim 1 wherein said unfiltered side is on an outer side of said filter medium; said filtered side is on an inner side of said filter medium.

6. A filter device according to claim 1 wherein said element retainer comprises a pipe connector forming a connection between a main part of said filter housing and said filter element; said water collecting space is located underneath said main part; and said adapter part comprises a sleeve body accommodated in said pipe connector.

7. A filter device according to claim 6 wherein said adapter part comprises an inner tube having an open end forming a connecting piece, said connecting piece extending and being sealed to said filtered fluid passage in fluid communication with said inner filter cavity to form a subsection of said first fluid passage; and an end cap is on a lower end of said filter element and comprises said filtered fluid passage.

8. A filter device according to claim 7 wherein
an intermediate space forms a water channel between an exterior of said inner tube and an interior of said sleeve body and forms said second fluid passage, water conveyed through said water passage of said end cap being flowable through an open lower end of said sleeve body into said collecting chamber.

9. A filter device according to claim 7 wherein
said sleeve body comprises first and second annular sections projecting radially outwardly and sealingly contacting an interior of said pipe connector of said element retainer, said annular sections being spaced from one another axially along a longitudinal axis of said sleeve body and forming an annulus on an exterior of said sleeve body between said annular sections and between said sleeve body and an interior of said pipe connector, said annulus being in fluid communication with said fluid outlet of said filter housing and forming an outlet section of said first fluid passage.

10. A filter device according to claim 9 wherein
a cross duct branches off in a region of a lower end of said inner tube of said adapter part facing away from said connecting piece, said cross duct emptying into said annulus continuing said first fluid passage through said inner tube and said connecting piece.

11. A filter device according to claim 3 wherein
said element retainer comprises a pipe connector forming a connection between a main part of said filter housing; and
said end cap on said lower end of said filter element comprises a bearing ring projecting axially downward from said end cap and engaging a facing end of said pipe connector of said element retainer.

12. A filter device according to claim 3 wherein
said end cap comprises a first annular body surrounding said fluid passage and projecting axially from said end cap into said separation zone, an interior of said annular body having said water passage.

13. A filter device according to claim 12 wherein
said end cap comprises a second annular body surrounding said filtered fluid passage and being radially inside said first annular body; and
a hydrophobic screen of said separation device rests against an exterior of said second annular body.

14. A filter device according to claim 13 wherein
said end cap comprises a ring-shaped depression between said first and second annular bodies, a breakthrough in said depression forming said water passage.

15. A filter device according to claim 2 wherein
said filter element has an end cap fixed thereon adjacent said element retainer; and
said adapter part is detachably connected to said end cap.

* * * * *